United States Patent
Ikarashi et al.

(10) Patent No.: US 9,529,287 B2
(45) Date of Patent: Dec. 27, 2016

(54) RECORDING SHEET

(71) Applicant: YUPO CORPORATION, Tokyo (JP)

(72) Inventors: Takuya Ikarashi, Ibaraki (JP); Shin Morooka, Ibaraki (JP); Mitsuhiro Ashikaga, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 14/650,444

(22) PCT Filed: Dec. 12, 2013

(86) PCT No.: PCT/JP2013/083289
§ 371 (c)(1),
(2) Date: Jun. 8, 2015

(87) PCT Pub. No.: WO2014/092142
PCT Pub. Date: Jun. 19, 2014

(65) Prior Publication Data
US 2015/0370182 A1  Dec. 24, 2015

(30) Foreign Application Priority Data
Dec. 14, 2012 (JP) ................ 2012-273862

(51) Int. Cl.
| | | |
|---|---|---|
| *G03G 7/00* | (2006.01) | |
| *C08J 7/04* | (2006.01) | |
| *D21H 19/22* | (2006.01) | |
| B32B 27/08 | (2006.01) | |
| D21H 17/13 | (2006.01) | |

(52) U.S. Cl.
CPC .......... *G03G 7/008* (2013.01); *C08J 7/042* (2013.01); *D21H 19/22* (2013.01); *G03G 7/004* (2013.01); *G03G 7/0073* (2013.01); *B32B 27/08* (2013.01); *C08J 2363/00* (2013.01); *D21H 17/13* (2013.01); *Y10T 428/254* (2015.01); *Y10T 428/273* (2015.01)

(58) Field of Classification Search
CPC ....... G03G 7/008; G03G 7/0073; B32B 27/08; B32B 27/18; B32B 27/32; B32B 27/36; B32B 2250/02; B32B 2323/00
See application file for complete search history.

(56) References Cited

U.S. PATENT DOCUMENTS

| | | |
|---|---|---|
| 4,320,041 A | 3/1982 | Abe et al. |
| 6,592,971 B2 | 7/2003 | Ochiai et al. |
| 6,790,514 B1 | 9/2004 | Almog et al. |
| 6,916,515 B1 | 7/2005 | Almog et al. |
| 2001/0003731 A1 | 6/2001 | Ochiai et al. |
| 2002/0100547 A1* | 8/2002 | Takahashi ........ G06K 19/07722 156/289 |
| 2004/0151881 A1 | 8/2004 | Almog et al. |
| 2005/0069655 A1* | 3/2005 | Yamamoto ............. B41M 5/508 428/32.18 |

FOREIGN PATENT DOCUMENTS

| | | |
|---|---|---|
| JP | S62-29447 B2 | 6/1987 |
| JP | H04-219277 A | 8/1992 |
| JP | H05-305780 A | 11/1993 |
| JP | H07-290654 A | 11/1995 |
| JP | H09-179329 A | 7/1997 |
| JP | H10-119428 A | 5/1998 |
| JP | 2001-219661 A | 8/2001 |
| JP | 2001-520408 A | 10/2001 |
| JP | 2002-113959 A | 4/2002 |
| JP | 2004-503805 A | 2/2004 |

OTHER PUBLICATIONS

International Search Report issued with respect to application No. PCT/JP2013/083289, mail date is Feb. 18, 2014.
International Preliminary Report on Patentability issued with respect to application No. PCT/JP2013/083289, mail date is Jun. 25, 2015.

* cited by examiner

*Primary Examiner* — Betelhem Shewareged
(74) *Attorney, Agent, or Firm* — Greenblum & Bernstein, P.L.C.

(57) ABSTRACT

A recording sheet is produced by coating and drying on a support formed of a thermoplastic resin film a coating solution containing an olefin copolymer emulsion having a solid content of 100 parts by mass and a silane coupling agent having a solid content of from 2 to 14 parts by mass to form a surface treatment layer having a solid content of from 0.1 to 5 g/m². The recording sheet has high adhesion property between the support layer and the surface treatment layer, is capable of being subjected to various kinds of printing including offset printing and flexographic printing, and particularly has excellent adhesion property between the surface treatment layer and the toner to prevent the toner from being dropped off even in the case where the recording sheet is subjected to an electrophotographic recording printing process using a liquid toner.

9 Claims, No Drawings

RECORDING SHEET

TECHNICAL FIELD

The present invention relates to a recording sheet containing a thermoplastic resin film as a support. Specifically, the invention relates to a recording sheet that is favorable as a sheet, such as poster paper used indoors and outdoors, sticker paper used indoors and outdoors, label paper for a container for frozen foods, a name sticker for industrial products (a label indicating directions for use or cautionary statements), and the like, due to the excellent water resistance, weather resistance and durability thereof as compared to natural paper. In particular, the invention relates to a recording sheet for an electrophotographic printing process using a liquid toner that is excellent in adhesion to the liquid toner.

BACKGROUND ART

As recording paper subjected to purposes that require water resistance, weather resistance and durability, such as various kinds of printing paper, various kinds of poster paper, various kinds of label paper, ink-jet recording paper, heat-sensitive recording paper, thermal transfer receiving paper, pressure sensitive transfer recording paper, and electrophotographic recording paper, there have been proposals of film synthetic paper obtained by mixing inorganic fine powder or an organic filler in a thermoplastic resin, such as a polyolefin based resin and a polyester resin, followed by stretching, and film paper containing as a support a transparent stretched film formed of the thermoplastic resin as a major component, on which a coating solution is coated by using various coating apparatus (see, for example, Patent Documents 1 to 4).

Patent Document 5 proposes a thermoplastic resin film that is excellent in transfer property, adhesion property and water resistant adhesion property of an ink in various printing processes, which is a thermal transfer film, particularly a melt thermal transfer film, that is excellent in transfer property, adhesion property and water resistant adhesion property of an ink under high temperature and high humidity conditions, and is capable of providing a clear image.

CITATION LIST

Patent Documents

Patent Document 1: JP-A-4-219277
Patent Document 2: JP-A-5-305780
Patent Document 3: JP-A-10-119428
Patent Document 4: JP-A-7-290654
Patent Document 5: JP-A-2002-113959

SUMMARY OF INVENTION

Technical Problem

However, in the case where the recording sheet described in Patent Document 5 is used as a recording sheet for electrophotographic recording printing using a liquid toner, which is being spread in recent years, the adhesion property, particularly the water resistant adhesion property, of the surface treatment layer and the toner of the resulting printed matter is insufficient, which provides a problem that on subjecting the printed matter to lamination, the printed image is easily peeled off along with the lamination film.

For addressing the problem, the amount of the crosslinking agent may be increased in the recording sheet described in Patent Document 5 to try to improve the adhesion property to the support formed of a thermoplastic resin, but the transfer property of the toner to the surface treatment layer is deteriorated thereby, resulting in considerable deterioration of the printability. Accordingly, it has been difficult to provide a recording sheet that has practical usefulness even when the recording sheet is subjected to electrophotographic recording printing using a liquid toner.

Under the circumstances, an object of the invention is to provide a recording sheet that has high adhesion property between the support layer and the surface treatment layer, is capable of being subjected to various kinds of printing including offset printing and flexographic printing, and particularly has sufficient adhesion property between the surface treatment layer and the toner to prevent the toner from being dropped off even in the case where the recording sheet is subjected to an electrophotographic recording printing process using a liquid toner.

Solution to Problem

As a result of earnest investigations made by the present inventors for solving the problem, it has been found that by forming a surface treatment layer of a recording sheet by using a coating solution containing an olefin copolymer emulsion and a silane coupling agent, the thermoplastic resin constituting the support and the olefin copolymer constituting the surface treatment layer may be crosslinked, and the olefin copolymers may be crosslinked to each other, so as to improve the water resistance considerably while maintaining the printability, thereby solving the problem. The invention has been completed based on the finding, and relates to a recording sheet having the following constitution.

(1) A recording sheet containing a support formed of a thermoplastic resin film, and a surface treatment layer provided on at least one surface of the support,
the surface treatment layer being formed by coating and drying on the support a coating solution containing an olefin copolymer emulsion (A) and a silane coupling agent (B),
a solid content of the silane coupling agent (B) contained in the coating solution being from 2 to 14 parts by mass per 100 parts by mass of a solid content of the olefin copolymer emulsion (A) contained in the coating solution, and
a solid content of the surface treatment layer being from 0.1 to 5 g/m².

(2) The recording sheet according to the item (1), wherein the coating solution further contains an ethyleneimine polymer (C).

(3) The recording sheet according to the item (1) or (2), wherein the silane coupling agent (B) has a group that reacts with an olefin copolymer constituting the olefin copolymer emulsion (A).

(4) The recording sheet according to any one of the items (1) to (3), wherein the silane coupling agent (B) has an alkoxysilyl group or a silanol group and has at least one functional group selected from the group consisting of an epoxy group, a vinyl group, a (meth)acryl group, an amino group, an ureido group, a mercapto group, and an isocyanate group.

(5) The recording sheet according to any one of the items (1) to (4), wherein the olefin copolymer emulsion (A) is an aqueous dispersion containing an olefin copolymer (a) containing a constitutional unit derived from an unsaturated carboxylic acid monomer or an anhydride thereof that is dispersed in water by using as a dispersant (b) at least one selected from the group consisting of a nonionic surfactant, a nonionic water-soluble polymer, a cationic surfactant, and a cationic water-soluble polymer, and a mass ratio (a)/(b) in terms of solid content of the olefin copolymer (a) and the dispersant (b) is from 100/1 to 100/40.

(6) The recording sheet according to any one of the items (1) to (5), wherein an olefin copolymer in the olefin copolymer emulsion (A) has a volume average particle diameter of from 0.2 to 3 μm.

(7) The recording sheet according to any one of the items (1) to (6), wherein the silane coupling agent (B) is an epoxy silane coupling agent.

(8) The recording sheet according to any one of the items (1) to (7), wherein the coating solution further contains a polymer antistatic agent (D).

(9) The recording sheet according to any one of the items (1) to (8), wherein the thermoplastic resin film contains a polyolefin based resin or a polyester resin.

Advantageous Effects of Invention

The recording sheet of the invention may have high adhesion property between the support layer and the surface treatment layer constituting the recording sheet, and in the case where the recording sheet is subjected to an electrophotographic recording printing process using a liquid toner, the recording sheet may have sufficient adhesion property between the surface treatment layer and the toner and may provide a printed matter that has high water resistance and is prevented from suffering drop-off of the toner. The recording sheet of the invention may also exhibit a significant effect of providing a printed matter having high water resistance in various kinds of printing, such as offset printing and flexographic printing.

DESCRIPTION OF EMBODIMENTS

The recording sheet of the invention will be described in detail below. The following description for the constitutional components may be made with reference to representative embodiments, but the invention is not limited to the embodiments. In the description herein, the numerical range shown with an upper limit value and/or a lower limit value is a range that includes the upper limit value and/or the lower limit value. In the description herein, the expression "(meth) acrylic" shows the meaning that includes both acrylic and methacrylic.

The recording sheet of the invention contains a support formed of a thermoplastic resin film, and a surface treatment layer provided on at least one surface of the support. The surface treatment layer is formed by coating and drying on the support a coating solution containing an olefin copolymer emulsion (A) and a silane coupling agent (B), in which the solid content of the silane coupling agent (B) contained in the coating solution is from 2 to 14 parts by mass per 100 parts by mass of the solid content of the olefin copolymer emulsion (A) contained in the coating solution, and the solid content of the surface treatment layer is from 0.1 to 5 g/m².

In the following description, the support and the surface treatment layer constituting the recording sheet of the invention will be described in detail, and the applications of the recording sheet will be also described.

(1) Surface Treatment Layer

The surface treatment layer in the recording sheet is provided on at least one surface of the support formed of a thermoplastic resin film. The surface treatment layer may be provided on only one surface of the support and may be provided on both surfaces of the support. The surface treatment layer is formed by coating and drying on the support a coating solution containing an olefin copolymer emulsion (A) and a silane coupling agent (B). The surface treatment layer may have high adhesion property to the support layer, and in the case where the recording sheet is subjected to an electrophotographic recording printing process using a liquid toner, the recording sheet may have sufficient adhesion property to the toner. According to the features, the use of the recording sheet of the invention may provide a printed matter that has high water resistance and is prevented from suffering drop-off of the toner. The surface treatment layer may have suitability to various kinds of printing, such as offset printing and flexographic printing, each of which may provide a printed matter having high water resistance.

(1-1) Composition of Coating Solution for Forming Surface Treatment Layer

The surface treatment layer in the recording sheet is formed with a coating solution containing an olefin copolymer emulsion (A) and a silane coupling agent (B). The amount ratio of the components of the coating solution for forming the surface treatment layer is that the solid content of the silane coupling agent (B) is from 2 to 14 parts by mass per 100 parts by mass of the solid content of the olefin copolymer emulsion (A).

Olefin Copolymer Emulsion (A)

The olefin copolymer emulsion (A) in the invention contains an aqueous dispersion medium and an olefin copolymer that is dispersed and emulsified in the aqueous medium. In the case where the recording sheet is subjected to an electrophotographic recording printing process using a liquid toner, it is considered that the olefin copolymer contained in the olefin copolymer emulsion (A) is softened with heat in the surface treatment layer and is fused to the liquid toner, and thereby the excellent effects, such as the strong adhesion property to the liquid toner and the support, and the water resistance, are exhibited.

The olefin copolymer capable of being used in the olefin copolymer emulsion (A) is preferably an olefin copolymer that contains a constitutional unit containing a carboxyl group or a salt thereof, which has favorable emulsifying property, as a copolymerization component. Representative examples of the copolymer include a copolymer obtained through copolymerization of an olefin monomer and an unsaturated carboxylic acid or an anhydride thereof, and a salt thereof.

Specific examples of the copolymer include an ethylene-(meth)acrylic acid copolymer, an ethylene-(meth)acrylate ester copolymer, an alkali or alkaline earth metal salt of an ethylene-(meth)acrylic acid copolymer, an ethylene-(meth) acrylate ester-maleic anhydride copolymer, a (meth)acrylic acid-grafted polyethylene, an ethylene-vinyl acetate copolymer, a maleic anhydride-grafted polyethylene, a maleic anhydride-grafted ethylene-vinyl acetate copolymer, a maleic anhydride-grafted (meth)acrylate ester-ethylene copolymer, a maleic anhydride-grafted polypropylene, a maleic anhydride-grafted ethylene-propylene copolymer, a maleic anhydride-grafted ethylene-propylene-butene copolymer, a maleic anhydride-grafted ethylene-butene copolymer, and maleic anhydride-grafted propylene-butene copolymer.

Among these, an ethylene-(meth)acrylic acid copolymer, an ethylene-(meth)acrylate ester copolymer, an ethylene-(meth)acrylate ester-maleic anhydride copolymer, an ethylene-vinyl acetate copolymer, a maleic anhydride-grafted ethylene-vinyl acetate copolymer, a maleic anhydride-grafted (meth)acrylate ester-ethylene copolymer, a maleic anhydride-grafted ethylene-propylene-butene copolymer, a maleic anhydride-grafted ethylene-butene copolymer, and a maleic anhydride-grafted propylene-butene copolymer that each have a melting point or a softening point of 130° C. or less are preferred from the standpoint of the toner acceptability.

The olefin copolymers may be used solely or as a combination of two or more kinds thereof.

The olefin copolymer emulsion (A) preferably contains a dispersant for dispersing the olefin copolymer in water to form the olefin copolymer emulsion (A). The dispersant used may be at least one selected from the group consisting of a nonionic surfactant, a nonionic water-soluble polymer, a cationic surfactant, and a cationic water-soluble polymer.

Examples of the nonionic surfactant include a polyoxyethylene alkyl ether, a polyoxyethylene alkyl allyl ether, a polyoxyethylene-oxypropylene block copolymer, a polyethylene glycol fatty acid ester, and a polyoxyethylene sorbitan fatty acid ester. Examples of the nonionic water-soluble polymer include a completely saponified polyvinyl alcohol, a partially saponified polyvinyl alcohol, and modified products thereof. Examples of the nonionic water-soluble polymer further include hydroxyethyl cellulose. Examples of the cationic surfactant include stearylamine hydrochloride, lauryltrimethylammonium chloride and trimethyloctadecylammonium chloride.

Examples of the cationic water-soluble polymer include a polymer having a quaternary ammonium salt structure or a phosphonium salt structure, a nitrogen-containing (meth)acrylic polymer, and a (meth)acrylic polymer having nitrogen of a quaternary ammonium salt structure. Preferred examples of the cationic water-soluble polymer used include a nitrogen-containing (meth)acrylic polymer and a (meth)acrylic polymer having nitrogen of a quaternary ammonium salt structure. The use thereof may further enhance the adhesion property to the thermoplastic resin film.

The dispersants may be used solely or as a combination of two or more kinds thereof.

In the case where the olefin copolymer is dispersed in water by using the dispersant, there is a tendency of facilitating dispersion of the olefin copolymer in water, and thus the dispersant is preferably used in an amount of 1 part by mass or more, more preferably 3 parts by mass or more, and further preferably 5 parts by mass or more, in terms of solid content of the dispersant, per 100 parts by mass of the solid content of the olefin copolymer. There is also a tendency of facilitating improvement of the ink adhesion property under a high temperature and high humidity condition, and thus the dispersant is preferably used in an amount of 40 parts by mass or less, more preferably 35 parts by mass or less, and further preferably 30 parts by mass or less, in terms of solid content of the dispersant, per 100 parts by mass of the solid content of the olefin copolymer.

Volume Average Particle Diameter of Olefin Copolymer Emulsion (A)

The volume average particle diameter of emulsion particles in the invention means a volume average particle diameter that is measured by using a laser diffraction particle size distribution analyzer (SALD-2200, available from Shimadzu Corporation).

The volume average particle diameter of the dispersed particles of the olefin copolymer emulsion (A) is preferably 0.2 µm or more, and more preferably 0.3 µm or more, from the standpoint of the energy efficiency in the production and the suppression of the amount of the emulsifier added in the production of emulsion. There is also a tendency of enhancing the still stability of the dispersed particles and further enhancing the adhesion property of the surface treatment layer containing the emulsion to the thermoplastic resin film, the volume average particle diameter is preferably 3 µm or less, more preferably less than 1 µm, further preferably 0.72 µm or less, and still further preferably 0.6 µm or less.

While the method of dispersing the olefin copolymer in water using the dispersant to form an emulsion is not particularly limited, such a method may be employed that the olefin copolymer is melted in an aromatic hydrocarbon solvent under heating, the dispersant is mixed therein under heating, the mixture is subjected to phase transfer with water added, and then the aromatic hydrocarbon solvent is distilled off to provide an aqueous dispersion, and such a method may also be employed that the olefin copolymer is fed to a hopper of a twin screw extruder and melted under heating, to which an aqueous solution of the dispersant is added, followed by melt-kneading, and then the mixture is subjected to phase transfer with water added to provide a dispersion, as described in JP-B-62-29447. In the case where the dispersant is a cationic water-soluble polymer, in particular, the use of the method described in JP-B-62-29447 may facilitate the control of the average particle diameter of the resin particles in the aqueous dispersion.

The content of the olefin copolymer in the olefin copolymer emulsion (A) is preferably 30% by mass or more, more preferably 35% by mass or more, and further preferably 40% by mass or more, for making a sufficient amount of the olefin copolymer to be contained in a suitable volume of the emulsion. The content of the olefin copolymer in the olefin copolymer emulsion (A) is preferably 65% by mass or less, more preferably 60% by mass or less, and further preferably 55% by mass or less, from the standpoint of facilitating the production of the olefin copolymer emulsion that has an intended volume average particle diameter.

Examples of commercially available products that are capable of being used as the olefin copolymer emulsion (A) include Aquatex AC-3100, EC-1200, MC-3800 and MC-4400, trade names, available from JCR Co., Ltd., and Chemipearl S100, S200, S300 and SA100, trade names, available from Mitsui Chemicals, Inc.

Silane Coupling Agent (B)

The silane coupling agent (B) in the surface treatment layer constituting the invention may exhibit an effect of firmly bonding the support formed of the thermoplastic resin film and the surface treatment layer.

It is expected that the silane coupling agent (B) may particularly form a network structure by bonding the thermoplastic resin of the support and the olefin copolymer emulsion (A), and bonding the olefin copolymer emulsion (A) with each other, through crosslinking reaction, so as to form the firm surface treatment layer, which forms a surface that is favorable as a recording sheet. It is also expected that the silane coupling agent (B) may be capable of being bonded to the ethyleneimine polymer (C) and the polymer antistatic agent (D) described later through crosslinking reaction, and these hydrophilic components (i.e., the polar resin components) may be further increased in molecular weight, thereby enhancing the water resistance.

The olefin copolymer emulsion (A), and the ethyleneimine polymer (C) and the polymer antistatic agent (D) described later each inherently contain a polar group in the molecular structure thereof, with which the surface treatment layer may have strong affinity to an ink, but these components each have high affinity to water, and thus a recording sheet having these components on a thermoplastic resin film has been insufficient in water resistance.

A surface treatment layer using these components may form a certainly firm coated film through the cohesive force of the resin after drying, but the surface treatment layer may not be bonded to a support, such as a thermoplastic resin film, with a strong force, and thus has a problem that the coated film is easily dropped off from the support when once water invades between the support and the coated film, resulting in that an ink and a toner may easily dropped off from a printed matter.

Under the circumstances, the inventors have made earnest investigations on an intermedium between the support and the surface treatment layer, and have reached idea that the problem may be solved by using the silane coupling agent (B) in the surface treatment layer.

The silane coupling agent (B) preferably has a group that reacts with the olefin copolymer constituting the olefin copolymer emulsion (A). The group that reacts with the olefin copolymer in the invention means a group that forms a bond through reaction with an atom or an atomic group contained in the olefin copolymer. The kind of the bond that is formed through the reaction is not particularly limited, and may be any of a covalent bond, an ionic bond, a hydrogen bond and the like. Examples of the group that reacts with the olefin copolymer include a silanol group and various functional group.

Preferred examples of the silane coupling agent (B) include ones that has in the molecule thereof an alkoxysilyl group or a silanol group, which is formed through hydrolysis of an alkoxysilyl group, and further has in the molecule thereof at least one functional group, such as an epoxy group, a vinyl group, a (meth)acryl group, an amino group, an ureido group, a mercapto group, and an isocyanate group.

In the system of the invention, it is expected that the silanol group of the silane coupling agent (B) undergoes condensation reaction with the thermoplastic resin of the support resulting in crosslinking reaction, whereas the functional group thereof undergoes condensation reaction with the (meth)acrylic acid residual group or the maleic anhydride residual group of the olefin copolymer emulsion (A) or the amine group of the ethyleneimine polymer (C) resulting in crosslinking reaction.

In alternative, it is expected that the silanol group of the silane coupling agent (B) undergoes condensation reaction with the (meth)acrylic acid residual group or the maleic anhydride residual group of the olefin copolymer emulsion (A) or the amine group of the ethyleneimine polymer (C) resulting in crosslinking reaction, whereas the functional group thereof is bonded to the thermoplastic resin of the support through the high affinity there between resulting in crosslinking reaction.

As a result, the recording sheet has high adhesion property between the support layer and the surface treatment layer and high adhesion property between the surface treatment layer and a printing ink, and thereby enables various kinds of printing to provide sufficient adhesion property to a printing ink and a toner, and thus it has been completed the development of the recording sheet that does not suffer drop-off of a printing ink and a toner.

The content of the alkoxysilyl group or the silanol group, which is formed through hydrolysis of an alkoxysilyl group, in the silane coupling agent (B) is preferably from 25 to 75%, and more preferably from 50 to 75%, for achieving firm adhesion between the support and the surface treatment layer and firm adhesion between the surface treatment layer and a printing ink or a toner. The content of the reactive functional group other than the alkoxysilyl group or the silanol group, which is formed through hydrolysis of an alkoxysilyl group, in the silane coupling agent (B) is preferably from 25 to 75%, and more preferably from 25 to 50%.

Examples of the silane coupling agent (B) that exhibits these effects include an epoxy silane coupling agent, a vinyl silane coupling agent, a (meth)acrylic silane coupling agent, an amino silane coupling agent, an ureido silane coupling agent, a mercapto silane coupling agent, and an isocyanate silane coupling agent.

Specific examples of the epoxy silane coupling agent include 3-glycidoxypropylmethyldimethoxysilane, 3-glycidoxypropyltrimethoxysilane, 3-glycidoxypropylmethyldiethoxysilane, 3-glycidoxypropyltriethoxysilane and 2-(3,4-epoxycyclohexyl)ethyltrimethoxysilane.

Specific examples of the vinyl silane coupling agent include vinyltrimethoxysilane and vinyltriethoxysilane.

Specific examples of the (meth)acrylic silane coupling agent include 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane.

Specific examples of the amino silane coupling agent include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane and N-(vinylbenzyl)-2-aminoethyl-3-aminopropyltrimethoxysilane.

Specific examples of the ureido silane coupling agent include 3-ureidopropyltriethoxysilane.

Specific examples of the mercapto silane coupling agent include 3-mercaptopropylmethyldimethoxysilane and 3-mercaptopropyltrimethoxysilane.

Specific examples of the isocyanate silane coupling agent include 3-isocyanatopropyltriethoxysilane.

The silane coupling agents (B) may be used solely or as a combination of two or more kinds thereof.

Examples of commercially available products that is capable of being used as the silane coupling agent (B) include KBM-303, KBM-402, KBM-403, KBE-402, KBE-403, KBM-1003, KBE-1003, KBM-502, KBM-503, KBE-502, KBE-503, KBM-5103, KBM-602, KBM-603, KBM-903, KBE-903, KBE-9103, KBM-573, KBM-575, KBE-585, KBM-802, KBM-803 and KBE-9007, all trade names, all available from Shin-Etsu Chemical Co., Ltd., and Z-6043, Z-6040, Z-6519, Z-6300, Z-6030, Z-6011, Z-6094 and Z-6062, all trade names, all available from Dow Corning Toray Co., Ltd.

Among these, an epoxy silane coupling agent, an amino silane coupling agent, a mercapto silane coupling agent, and an isocyanate silane coupling agent are preferably used, and an epoxy silane coupling agent is more preferably used, from the standpoint of the adhesion property to a printing ink and a toner.

An epoxy silane coupling agent, an ureido silane coupling agent, and an isocyanate silane coupling agent are preferably used, and an epoxy silane coupling agent is more preferably used, from the standpoint of the facility of crosslinking reaction with the olefin copolymer emulsion (A) and primary to tertiary amino groups contained in the ethyleneimine polymer (C) described later.

In the case where a polyolefin based resin is used as the thermoplastic resin of the thermoplastic resin film, a vinyl silane coupling agent and a (meth)acrylic silane coupling agent are preferably used, and in the case where a polyester resin is used as the thermoplastic resin, an epoxy silane coupling agent and an amino silane coupling agent are preferably used, all from the standpoint of the adaptability to the thermoplastic resin film.

In the case where metal oxide particles are present on the surface of the support, an amino silane coupling agent, an ureido silane coupling agent, and a mercapto silane coupling agent are preferably used from the standpoint of the adsorption to the particles to form a firm bond.

The surface treatment layer in the invention is preferably formed in such a manner that the olefin copolymer emulsion (A) and the silane coupling agent (B), and preferably the ethyleneimine polymer (C) and the polymer antistatic agent (D) described later in addition thereto, are dissolved in an aqueous medium to form a coating solution, and the coating solution is coated and dried on the support, from the standpoint of the simplicity of the process.

It is known that a silane coupling agent may be controlled in the hydrolysis rate thereof by the kind of the alkoxysilyl group, and by utilizing the nature of the silane coupling agent, it is possible to suppress the deterioration of the coating solution due to the self-condensation of the silane coupling agent, and to enhance the temporal stability.

Accordingly, the silane coupling agent (B) used is more preferably an epoxy silane coupling agent that is excellent in the aforementioned properties, and particularly has high solubility in water on handling as the coating solution, and high temporal stability. Among these, 3-glycidoxypropyltrimethoxysilane is most preferably used.

In the coating solution, it is expected that the alkoxysilane group of the silane coupling agent (B) is converted to a silanol group through hydrolysis, and the silanol group forms a hydrogen bond or a chemical bond to the functional group (such as a hydroxyl group and a carboxyl group) on the thermoplastic resin film having been subjected to a surface oxidation treatment, thereby enhancing the adhesion property between the support and the surface treatment layer.

It is also expected that the cohesive force of the surface treatment layer itself is enhanced through the condensation reaction of the silanol groups, and thereby the surface treatment layer itself is enhanced in physical strength.

Ethyleneimine Polymer (C)

An ethyleneimine polymer (C) has high affinity to various printing inks, particularly an ultraviolet ray-curable ink, and thus is preferably used in the surface treatment layer in the recording sheet for enhancing the adhesion property of the surface treatment layer to the inks.

Examples of the polymer include polyethyleneimine, poly(ethyleneimine-urea), an ethyleneimine adduct of polyamine polyamide, and an alkyl-modified product, a cycloalkyl-modified product, an aryl-modified product, an allyl-modified product, an aralkyl-modified product, a benzyl-modified product, a cyclopentyl-modified product, a cyclic aliphatic hydrocarbon-modified product, a glycidol-modified product and a hydroxide of these compounds. These polymers may be used solely or as a combination of plural kinds thereof. Examples of the modifier for providing the modified products include methyl chloride, methyl bromide, n-butyl chloride, lauryl chloride, stearyl iodide, oleyl chloride, cyclohexyl chloride, benzyl chloride, allyl chloride and cyclopentyl chloride.

Among these, the ethyleneimine polymer (C) that is represented by the following chemical formula (I) is preferably used from the standpoint of the transfer property and the adhesion property to a printing ink, particularly an ultraviolet ray-curable ink.

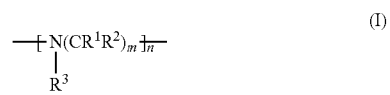

In the formula (I), $R^1$ and $R^2$ each independently represent a hydrogen atom, a linear or branched alkyl group having from 1 to 12 carbon atoms, or an alkyl group or an aryl group having an alicyclic structure having from 6 to 12 carbon atoms; $R^3$ represents a hydrogen atom, an alkyl group or an allyl group having from 1 to 18 carbon atoms, which may have a hydroxyl group, or an alkyl group or an allyl group having an alicyclic structure having from 6 to 12 carbon atoms, which may have a hydroxyl group; m represents an integer of from 2 to 6; and n represents an integer of from 20 to 3,000.

The ethyleneimine polymers (C) may be used solely or as a combination of two or more kinds thereof.

Examples of commercially available products that is capable of being used as the ethyleneimine polymer (C) include Epomin, a trade name, available from Nippon Shokubai Co., Ltd., Polymin SK, a trade name, available from BASF AG, and Saftomer AC-72 and AC-2000, trade names, available from Mitsubishi Chemical Corporation.

Polymer Antistatic Agent (D)

An antistatic agent (D) is preferably added to the surface treatment layer of the recording sheet for enhancing the handleability (antistatic property) of the recording sheet, thereby suppressing adhesion of dusts thereto due to static charge in the winter season and suppressing running failures of the recording sheet on a printer due to static charge on printing.

In the antistatic agent, a polymer antistatic agent is preferably selected for suppressing surface contamination and surface deterioration with the lapse of time due to bleed-out thereof.

The polymer antistatic agent (D) is not particularly limited, and examples thereof used include cationic, anionic, amphoteric and nonionic antistatic agents.

Examples of the cationic antistatic agent include antistatic agents having an ammonium salt structure and a phosphonium salt structure. Examples of the anionic antistatic agent include antistatic agents having structures of an alkali metal salt (such as a lithium salt, a sodium salt and a potassium salt) of sulfonic acid, phosphoric acid and carboxylic acid. Examples of the anionic antistatic agent include antistatic agent having structures of an alkali metal salt of acrylic acid, methacrylic acid and maleic acid or anhydride thereof, in the molecular structure thereof.

Examples of the amphoteric antistatic agent include antistatic agent having structures containing both a cationic antistatic agent and an anionic antistatic agent in one molecule. Examples of the amphoteric antistatic agent include a betaine antistatic agent. Examples of the nonionic antistatic agent include an ethylene oxide polymer having an alkylene oxide structure, and a polymer having an ethylene oxide polymer component in the molecular chain thereof. Examples of the other antistatic agent include a polymer antistatic agent having boron in the molecular structure thereof.

As the polymer antistatic agent (D), a nitrogen-containing polymer antistatic agent is preferably used, and a tertiary nitrogen-containing or quaternary nitrogen-containing acrylic resin is more preferably used.

The polymer antistatic agents may be used solely or as a combination of two or more kinds thereof.

Examples of commercially available products that are capable of being used as the polymer antistatic agent (D) include Saftomer ST-1000, ST-1100 and ST-3200, trade names, available from Mitsubishi Chemical Corporation.

The surface treatment layer of the recording sheet may further contain a pH modifier, a defoaming agent, other auxiliary agents and the like, depending on necessity, in such a range that does not impair the advantageous effects of the invention.

Amount Ratios

All the amounts of the components in the coating solution for forming the surface treatment layer in the invention each are expressed as an amount ratio (by mass) of the solid content of the component per 100 parts by mass of the solid content of the olefin copolymer emulsion (A).

In the case where the recording sheet is used in an electrophotographic printing process using a liquid toner, the amount of the solid content of the silane coupling agent (B) in the coating solution is from 2 to 14 parts by mass per 100 parts by mass of the solid content of the olefin copolymer emulsion (A) from the standpoint of the sufficient adhesion property to the toner to provide a printed matter that has high water resistance and is prevented from suffering drop-off of the toner. The amount of the silane coupling agent (B) is preferably 2.5 parts by mass or more, and more preferably 5 parts by mass or more. The amount of the silane coupling agent (B) is preferably 12 parts by mass or less, and more preferably 10 parts by mass or less.

In the case where the ethyleneimine polymer (C) is further added to the coating solution for forming the surface treatment layer, the amount of the ethyleneimine polymer (C) added is preferably 0.01 parts by mass or more, more preferably 1 part by mass or more, and further preferably 2 parts by mass or more, per 100 parts by mass of the solid content of the olefin copolymer emulsion (A), and the amount of the ethyleneimine polymer (C) added is preferably 25 parts by mass or less, more preferably 15 parts by mass or less, further preferably 10 parts by mass or less, and still further preferably 5 parts by mass or less, per 100 parts by mass of the solid content of the olefin copolymer emulsion (A).

In the case where the polymer antistatic agent (D) is further added to the coating solution for forming the surface treatment layer, the amount of the polymer antistatic agent (D) added is preferably 0.01 parts by mass or more, more preferably 1 part by mass or more, and further preferably 2 parts by mass or more, per 100 parts by mass of the solid content of the olefin copolymer emulsion (A), and the amount of the polymer antistatic agent (D) added is preferably 25 parts by mass or less, more preferably 15 parts by mass or less, further preferably 10 parts by mass or less, and still further preferably 5 parts by mass or less, per 100 parts by mass of the solid content of the olefin copolymer emulsion (A).

(1-2) Formation Method of Surface Treatment Layer

The formation method of the surface treatment layer is not particularly limited, and the surface treatment layer is preferably formed by a method containing: a step of dissolving the aforementioned components constituting the surface treatment layer in a solvent in the aforementioned amount ratios to form a coating solution; a step of coating the coating solution thus prepared, on at least one surface of a support; and a step of drying and solidifying the coating solution thus coated. According to the procedures, the recording sheet may be produced by roll-to-roll, and thus the productivity may be enhanced. Furthermore, the thickness of the surface treatment layer may be controlled relatively easily, and thus the recording sheet that has intended characteristics may be produced, for example, the thickness of the surface treatment layer may be reduced while maintaining the printability.

Coating Solution

The aforementioned components constituting the surface treatment layer may be dissolved in a solvent to prepare a coating solution.

The solvent may be water, may be an organic solvent, such as methyl alcohol, ethyl alcohol, isopropyl alcohol, acetone, methyl ethyl ketone, ethyl acetate, toluene or xylene, or may be a mixed solvent of water and an organic solvent. The solvent is preferably water or a solvent that contains water as a major component, and the use thereof is preferred from the standpoint of the simplicity of the process management and the safety. The solid content of the coating solution is preferably 0.5% by mass or more, and more preferably 10% by mass or more, and is preferably 40% by mass or less, and more preferably 25% by mass or less, based on the total coating solution.

Coating Step

The coating step may be performed along with the forming process of the thermoplastic resin film in the forming process line of the film, or may be performed to the formed film in a separate line from the forming line of the thermoplastic resin film. The coating step of the support may be performed by using a coating equipment, such as a roll coater, a blade coater, a bar coater, an air knife coater, a size press coater, a gravure coater, a die coater, a lip coater and a spray coater.

Coating Amount

The surface treatment layer is formed by coating and drying on the support a coating solution containing the olefin copolymer emulsion (A) and the silane coupling agent (B). The solid content of the surface treatment layer after drying per one surface is 0.1 g/m$^2$ or more, preferably 0.25 g/m$^2$ or more, and more preferably 0.3 g/m$^2$ or more, since such a tendency may be provided that the adhesion property to various printing inks, such as an offset printing ink, and the adhesion property to a liquid toner in an electrophotographic recording printing process using the liquid toner are sufficiently obtained, and the solid content of the surface treatment layer after drying per one surface is 5 g/m$^2$ or less, preferably 3 g/m$^2$ or less, and more preferably 1.5 g/m$^2$ or less, since the coating step may be controlled relatively easily, the productivity of the printing medium may be enhanced, and the coating unevenness may be prevented.

Thickness of Surface Treatment Layer

The thickness of the surface treatment layer is preferably 0.1 μm or more, more preferably 0.25 μm or more, and further preferably 0.3 μm or more. The thickness of the surface treatment layer is preferably 5 μm or less, more preferably 3 μm or less, and further preferably 1.5 μm or less. When the thickness of the surface treatment layer is from 0.1 to 5 μm, there is a tendency of facilitating the production of a recording sheet that has the intended capabilities including the suitability to various printing processes and has a texture like the ordinary printing sheets.

(2) Support

The support in the recording sheet may impart to the recording sheet mechanical strength, such as stiffness, which is important for the printability, water resistance, chemical resistance, and depending on necessity opacity and the like. In the invention, a thermoplastic resin film is used as the support particularly for imparting water resistance to the recording sheet and the printed matter.

The composition, the structure and the production method of the thermoplastic resin film used in the recording sheet will be described in detail below.

(2-1) Composition of Thermoplastic Resin Film

[Thermoplastic Resin]

The thermoplastic resin used in the thermoplastic resin film is not particularly limited as far as the resin may be formed into a thin film suitable for the recording sheet and has suitable mechanical strength and stiffness, water resistance, chemical resistance and the like. Specific examples of the thermoplastic resin include a polyolefin based resin, such as a polypropylene based resin, high density polyethylene, medium density polyethylene, linear low density polyethylene, an ethylene-vinyl acetate copolymer, an ethylene-acrylic acid copolymer, an ethylene-methacrylic acid copolymer, a metal salt of an ethylene-methacrylic acid copolymer (ionomer), an ethylene-alkyl acrylate copolymer and an ethylene-alkyl methacrylate copolymer, in which the alkyl group preferably has from 1 to 8 carbon atoms, poly-4-methyl-1-pentene, and an ethylene-cyclic olefin copolymer; a polyester resin, such as polyethylene terephthalate, polybutylene terephthalate, polyethylene naphthalate, polybutylene succinate and polylactic acid; a polyamide resin, such as nylon-6, nylon-6,6, nylon-6,10 and nylon-6,12; a polystyrene resin, such as syndiotactic polystyrene, atactic polystyrene, an acrylonitrile-styrene copolymer and an acrylonitrile-butadiene-styrene copolymer; and a thermoplastic resin, such as a polyvinyl chloride resin and polycarbonate. Among these, a polyolefin based resin, such as a propylene resin and high density polyethylene; and a polyester resin, such as polyethylene terephthalate, are preferably used from the standpoint of the aforementioned properties, the production cost and the like. The resins may be used as a mixture of two or more kinds thereof.

Among these thermoplastic resins, a polypropylene based resin is more preferably used from the standpoint of the formability of the film.

Preferred examples of the polypropylene based resin include isotactic homopolypropylene and syndiotactic homopolypropylene, which are obtained through homopolymerization of propylene. Preferred examples thereof also include propylene copolymers having various stereoregularities obtained through copolymerization of propylene as a major component with an $\alpha$-olefin, such as ethylene, 1-butene, 1-hexene, 1-heptene, 1-octene and 4-methyl-1-pentene. The propylene copolymer may be a binary system or a multicomponent system, i.e., a ternary or higher system, and may be a random copolymer or a block copolymer.

Inorganic Fine Powder and Organic Filler

The thermoplastic resin film in the invention may contain other components than the thermoplastic resin. For example, the thermoplastic resin film may contain at least one of an inorganic fine powder and an organic filler. A film obtained by stretching a thermoplastic resin film containing inorganic fine powder or the like may have a large number of fine pores formed with the inorganic fine powder as nuclei inside the thermoplastic resin film, and thus may have further whiteness, opacity and lightweight property. As a result, a favorable recording sheet with enhanced visibility of printing may be obtained.

The inorganic fine powder used in the thermoplastic resin film is not particularly limited in kind thereof as far as the inorganic fine powder may impart whiteness and opacity to the thermoplastic resin film. Specific examples of the inorganic fine powder include heavy calcium carbonate, light calcium carbonate, baked clay, talc, diatom earth, barium sulfate, magnesium oxide, zinc oxide, titanium dioxide and silicon dioxide. Examples thereof also include these kinds of powder having been surface-treated with an aliphatic acid, a polymer surfactant, an antistatic agent and the like. Among these, heavy calcium carbonate, light calcium carbonate, baked clay and talc are preferred since they have good pore forming property and are inexpensive. The use of titanium dioxide, zinc oxide and barium oxide is also preferred for enhancing the whiteness and opacity.

In the invention, the thermoplastic resin film may contain an organic filler for the same purpose as the inorganic fine powder.

The organic filler used in the thermoplastic resin film is also not particularly limited in kind thereof. The organic filler is preferably incompatible with the thermoplastic resin, preferably has a melting point or a glass transition temperature that is higher than the thermoplastic resin, and is preferably capable of being dispersed finely under the melt-kneading condition of the thermoplastic resin. Examples of the organic filler in the case where the thermoplastic resin is a polyolefin based resin include polyethylene terephthalate, polybutylene terephthalate, polyethylene naphthalate, polystyrene, polyamide, polycarbonate, polyethylene sulfide, polyphenylene sulfide, polyimide, polyether ketone, polyether ether ketone, polymethyl methacrylate, poly-4-methyl-1-pentene, a homopolymer of a cyclic olefin, and a copolymer of a cyclic olefin and ethylene. Fine powder of a thermosetting resin, such as a melamine resin, may also be used. A thermoplastic resin that has been insolubilized through crosslinking may also be preferably used.

One kind selected from the inorganic fine powder and the organic fillers described above may be used solely, or two or more kinds selected therefrom may be used as a combination. In the case where two or more kinds thereof are used in combination, the inorganic fine powder and the organic filler may be combined.

The average particle diameter of the inorganic fine powder and the average dispersed particle diameter of the organic filler each are preferably 0.01 μm or more, more preferably 0.1 μm or more, and further preferably 0.5 μm or more. The average particle diameter of the inorganic fine powder and the average dispersed particle diameter of the organic filler capable of being used in the invention each are preferably 0.01 μm or more from the standpoint of the facility in mixing with the thermoplastic resin. In the case where pores are formed inside the film by stretching to enhance the opacity and the printability, the average particle diameter of the inorganic fine powder and the average dispersed particle diameter of the organic filler each are preferably 30 μm or less, more preferably 20 μm or less, and further preferably 15 μm or less, from the standpoint of preventing troubles from occurring, such as breakage of the sheet on stretching and deterioration of the strength of the surface layer.

The average particle diameter of the inorganic fine powder capable of being used in the invention may be measured, for example, as a particle diameter at an accumulation of 50% (50%-accumulated particle diameter) measured, as an example with a particle measuring apparatus, for example, with a laser diffraction particle measuring apparatus, Microtrac, a trade name, available from Nikkiso Co., Ltd. The particle diameter of the organic filler having been dispersed in the thermoplastic resin through melt-kneading and dispersion may also be obtained in such a manner that at least 10 particles on a cross sectional surface of the thermoplastic film are measured for the maximum diameter thereof with an electron microscope, and the average value thereof is designated as the particle diameter.

In the invention, in the case where the thermoplastic resin film contains at least one of the inorganic fine powder and the organic filler, the content of the inorganic fine powder and the organic filler in the thermoplastic resin film is preferably 1% by mass or more, more preferably 3% by mass or more, and particularly preferably 5% by mass or more, since when the content of the inorganic fine powder and the organic filler is 1% by mass or more, the purposes of the addition of the inorganic fine powder and the organic filler to the thermoplastic resin film, such as imparting opacity to the resulting thermoplastic resin film, may be achieved.

The content of the inorganic fine powder and the organic filler in the thermoplastic resin film is preferably 45% by mass or less, more preferably 40% by mass or less, and particularly preferably 35% by mass or less, since when the content of the inorganic fine powder and the organic filler is 45% by mass or less, the resulting thermoplastic resin film may have suitable strength improving the handleability of the recording sheet.

Arbitrary Components

In the invention, the thermoplastic resin film may arbitrarily contain known additives depending on necessity.

Examples of the additives include known ones including an antioxidant, a light stabilizer, an ultraviolet ray absorbent, a dispersant, such as inorganic fine powder, a slip agent, such as an aliphatic acid amide, an antiblocking agent, a dye, a pigment, a plasticizer, a crystal nucleating agent, a mold releasing agent and a flame retardant. In the case where the recording sheet is demanded to have durability, such as poster paper used outdoors, in particular, an antioxidant, a light stabilizer and the like are preferably added.

In the case where an antioxidant is added, a sterically hindered phenol antioxidant, a phosphoric acid antioxidant, an amine antioxidant and the like are preferably used in an amount in a range of from 0.001 to 1% by mass. In the case where a light stabilizer is used, a sterically hindered amine light stabilizer, a benzotriazole light stabilizer, a benzophenone light stabilizer and the like are preferably used in an amount in a range of from 0.001 to 1% by mass. These materials are preferably added in such a range that does not impair the adhesion between the thermoplastic resin film and the surface treatment layer.

(2-2) Structure of Support

Layer Structure of Thermoplastic Resin Film

The thermoplastic resin film that is capable of being used as the support of the recording sheet may be obtained by forming a thermoplastic resin into a film to provide the intended thermoplastic resin film. The thermoplastic resin film may be obtained by forming a thermoplastic resin that arbitrarily contains inorganic fine powder, an organic filler, known additives and the like, into a film.

The thermoplastic resin film may have a single layer structure or a multilayer structure.

A preferred embodiment of the thermoplastic resin film as the support in the invention is a multilayer structure, in which the layers thereof are imparted with particular properties respectively. For example, the thermoplastic resin film may have a three-layer structure, i.e., surface layer (i)/base layer/surface layer (ii), in which the base layer may be imparted with stiffness, opacity, lightweight property and the like that are suitable for the recording sheet. The surface layer (i) and the surface layer (ii) may have the same surface structure or may have different surface structures respectively. For example, one of the surface layers may have a surface structure that is suitable for providing the surface treatment layer thereon, whereas the other surface layer may have a surface structure that is suitable for providing a pressure-sensitive adhesive layer thereon, and thereby the recording sheet that is suitable for label paper may be provided. Furthermore, not only the curl of the support, but also the curl of the recording sheet and the label paper may be controlled to a particular range by appropriately designing the composition and the thickness of one of the surface layers and the other thereof respectively. Moreover, the thermoplastic resin film may have a multilayer structure, in which a solid printed layer is inserted between the layers except for the outermost layer, or a pigment-containing layer is provided in the layers except for the outermost layer, so as to provide a concealing layer in the thermoplastic resin film, and thereby a printed image on one surface of the recording sheet used as poster paper or the like may be prevented from being viewed through from the back surface thereof, enhancing the visibility of printed images on both surfaces thereof.

Thickness

The thickness of the thermoplastic resin film is preferably 30 μm or more, and more preferably 50 μm or more, since there is a tendency that sufficient mechanical strength may be obtained even in the case where the recording sheet is used as a large-size poster displayed outdoors. The thickness of the thermoplastic resin film is preferably 500 μm or less, and more preferably 300 μm or less, since there is a tendency that the recording sheet may not be too heavy to enhance the handleability thereof.

Porosity

In the case where the thermoplastic resin film has pores thereinside, the thermoplastic resin film may have opacity and lightweight property. The ratio of the pores in the film may be expressed by the porosity.

The porosity of the thermoplastic resin film is preferably 10% or more, more preferably 12% or more, further preferably 15% or more, and particularly preferably 20% or more, from the standpoint of providing opacity. The porosity of the thermoplastic resin film is preferably 45% or less, more preferably 44% or less, further preferably 42% or less, and particularly preferably 40% or less, from the standpoint of maintaining the mechanical strength.

The porosity of the thermoplastic resin film may be measured in such a measurement method that the cross sectional surface of the thermoplastic resin film is observed with an electron microscope, and the porosity is obtained from the ratio of the area that is occupied by the pores within the observed region. Specifically, the porosity may be obtained in the following manner. An arbitrary part of the resin film specimen is cut out and solidified by embedding in an epoxy resin, which is then cut with a microtome to form a cut surface perpendicular to the film plane. The specimen is attached to an observation specimen state with the cut surface being the observation surface, and gold-palladium or the like is vapor-deposited on the observation surface. The pores on the surface are observed with an electron microscope at an arbitrary magnification (for example, 500 to 3,000), and the image data of the observed region is loaded to an image analyzer. The image data is then processed with the image analyzer to provide the area ratio of the pores, which is designated as the porosity. In this case, the porosity may be an average value of measured values obtained through observation of arbitrary 10 or more regions.

(2-3) Production of Support

Forming of Thermoplastic Resin Film

The thermoplastic resin film may be produced by one or a combination of various known methods, and the forming method thereof is not particularly limited. Any thermoplastic resin film produced by any method is included in the invention unless it deviates from the substance of the invention.

The thermoplastic resin film may be formed as a film layer containing the thermoplastic resin, for example, by cast forming, in which a molten resin is extruded into a sheet through a T-die, an I-die or the like of a single layer or multiple layers connected to a screw extruder, calender forming, roll forming, inflation forming, or the like. A film layer containing the thermoplastic resin may also be formed in such a manner that a mixture of the thermoplastic resin and an organic solvent or an oil is formed by cast forming or calender forming to form a film, from which the solvent or the oil is then removed.

Multilayer Structure of Thermoplastic Resin Film

The thermoplastic resin film may have a multilayer structure, such as a two-layer structure and a three-layer or higher structure. Various known methods may be used for producing the thermoplastic resin film having a multilayer structure, and specific examples of the methods include a multilayer die method using a feed block and a multiple manifold, and an extrusion lamination method using plural dies. The multilayer die method and the extrusion lamination method may be used in combination.

Stretching of Thermoplastic Resin Film

The thermoplastic resin film may be an unstretched film or a stretched film. Various known methods may be used for stretching the film, and the method therefor is not particularly limited.

For example, the thermoplastic resin may be melt-kneaded with a screw extruder, and the molten resin may be extruded through a T-die or an I-die connected to the extruder to form a sheet, which may be then stretched to provide the resin film. In this case, examples of the stretching method include a roll longitudinal stretching method utilizing a difference in circumferential velocity among plural rolls, a transverse stretching method utilizing a tenter oven, a sequential biaxially stretching method using these methods in combination. Examples of the stretching method used also include a rolling method, a simultaneous biaxially stretching method utilizing a tenter oven and a pantograph in combination, and a simultaneous biaxially stretching method utilizing a tenter oven and a linear motor in combination. Examples of the stretching method used further include a simultaneous biaxially stretching method, in which a molten resin is extrusion-molded into a tube by using a circular die connected to a screw extruder, and air is blown into the tube (inflation forming).

In the case where the thermoplastic resin film is constituted by plural layers, at least one layers thereof is preferably stretched. In the case where plural layers are stretched, the layers may be stretched respectively before laminating the layers, or the layers may be stretched simultaneously after laminating. Furthermore, stretched layers may be laminated and then further stretched.

The thermoplastic resin film is preferably stretched at a temperature in a range that is suitable for the thermoplastic resin contained in the film. In the case where the thermoplastic resin used in the thermoplastic resin film is an amorphous resin, the stretching temperature of the film is preferably in a range of the glass transition temperature of the thermoplastic resin or higher. In the case where the thermoplastic resin used in the film is a crystalline resin, the stretching temperature of the film is preferably in a range of the glass transition temperature of the amorphous resin of the thermoplastic resin or higher and the melting point of the crystalline portion of the thermoplastic resin or lower. Specifically, the stretching temperature of the film layer is preferably a temperature that is lower by from 2 to 60° C. than the melting point of the thermoplastic resin used in the film layer.

The stretching speed on stretching the thermoplastic resin film is not particularly limited, and is preferably in a range of from 20 to 350 m/min for stable stretching of the thermoplastic resin film. The stretching ratio on stretching the thermoplastic resin film is not particularly limited, and may be appropriately determined in consideration of the characteristics of the thermoplastic resin, and the like.

For example, in the case where a film containing a homopolymer or copolymer of propylene as the thermoplastic resin is stretched uniaxially, the stretching ratio is generally approximately 1.2 times or more, and preferably 2 times or more, and is generally 12 times or less, and preferably 10 times or less. In the case where the same film is stretched biaxially, the stretching ratio in terms of area stretching ratio is generally 1.5 times or more, and preferably 10 times or more, and is generally 60 times or less, and preferably 50 times or less.

In the case where a film containing a polyester resin as the thermoplastic resin is stretched uniaxially, the stretching ratio is generally 1.2 times or more, and preferably 2 times or more, and is generally 10 times or less, and preferably 5 times or less. In the case where the same film is stretched biaxially, the stretching ratio in terms of area stretching ratio is generally 1.5 times or more, and preferably 4 times or more, and is generally 20 times or less, and preferably 12 times or less.

When the stretching ratio is in the range, there is a tendency that intended pores may be formed to enhance the opacity, and the thermoplastic resin film may be prevented from being broken to enable stable stretching.

Surface Treatment of Thermoplastic Resin Film

The thermoplastic resin film is preferably subjected to a surface oxidation treatment on the surface thereof before providing the surface treatment layer to produce the recording sheet. The surface oxidation treatment may further enhance the adhesion property between the thermoplastic resin film and the surface treatment layer.

Examples of the surface oxidation treatment include a processing method selected from a corona discharge treatment, a flame treatment, a plasma treatment, a glow discharge treatment and an ozone treatment, and these treatments may be used in combination.

In the case where the surface oxidation treatment is performed, a corona discharge treatment or a flame treatment is preferably performed. In the case where a corona discharge treatment is performed, the throughput of the treatment is preferably 600 $J/m^2$ (10 $W·min/m^2$) or more, and more preferably 1,200 $J/m^2$ (20 $W·min/m^2$) or more, and is preferably 12,000 $J/m^2$ (200 $W·min/m^2$) or less, and more preferably 10,800 $J/m^2$ (180 $W·min/m^2$) or less. In the case where a flame treatment is performed, the throughput of the treatment is preferably 8,000 $J/m^2$ or more, and more preferably 20,000 $J/m^2$ or more, and is preferably 200,000 $J/m^2$ or less, and more preferably 100,000 $J/m^2$ or less.

(3) Purposes of Recording Sheet

The recording sheet of the invention may be applied to various printing processes including offset printing, letter press printing, gravure printing, flexographic printing and screen printing, and is excellent in adhesion property to an ink of the resulting printed matter, and excellent in water resistance, weather resistance and durability, and thus the recording sheet is favorable as a recording sheet for a poster used indoors and outdoors, a sticker used indoors and outdoors, a label for a container for frozen foods, and a name sticker for industrial products (a label indicating directions for use or cautionary statements).

The recording sheet of the invention is particularly excellent in adhesion property to a toner of a printed matter obtained by an electrophotographic printing process using a liquid toner, and is suitable for such purposes as printing in a small lot, printing of variable information, and the like. The recording sheet of the invention may provide a printed matter that is excellent in water resistance and a laminated product of the printed matter that is excellent in water resistance, and thus is suitable for a recording sheet for a menu, a photobook, a poster, a sticker and the like used indoors and outdoors.

Example

The features of the invention will be described more specifically with reference to the production examples, the examples and the comparative examples below.

The materials, the amounts used, the ratios, the contents of the treatments, the procedures of the treatments, and the like shown in the production examples and the examples below may be appropriately changed unless they deviate from the substance of the invention. Accordingly, the invention is not construed as being limited to the specific examples shown below.

Production of Support

Production Example 1 of Support

A resin composition (a) formed of 67% by mass of a propylene homopolymer (Novatec PP MA-8, a trade name, available from Japan Polypropylene Corporation, melting point: 164° C.), 10% by mass of high density polyethylene (Novatec HD HJ580, a trade name, available from Japan Polyethylene Corporation, melting point: 134° C.), and 23% by mass of calcium carbonate powder having an average particle diameter of 1.5 μm was melt-kneaded at 260° C. and extruded through a die into a film with an extruder, and the film was cooled to 50° C. The film was again heated to 140° C. and then stretched 5 times in the longitudinal direction by utilizing a difference in circumferential velocity among plural rolls, thereby providing a uniaxially stretched film as a base layer.

Separately, a resin composition (b) formed of 51.5% by mass of a propylene homopolymer (Novatec PP MA-3, a trade name, available from Japan Polypropylene Corporation), 3.5% by mass of high density polyethylene (Novatec HD HJ580, a trade name, available from Japan Polyethylene Corporation), 42% by mass of calcium carbonate powder having an average particle diameter of 1.5 μm, and 3% by mass of titanium oxide powder having an average particle diameter of 0.8 μm was melt-kneaded at 250° C. in separate two extruders, the resin composition was extruded from each of the extruders through dies into films and laminated on both surfaces of the uniaxially stretched film, thereby providing a laminated film having a three-layer structure (resin composition: b/a/b), i.e., surface layer/base layer/surface layer.

The laminated film having a three-layer structure was introduced into a tenter oven, heated to 155° C., then stretched 8 times in the transverse direction with a tenter, then annealed at 164° C. (annealing), and then cooled to 55° C., and the edges of the film were slit, thereby providing a thermoplastic resin film having a thickness of 80 μm, which was designated as a support. The support had a porosity of 34%.

Production Example 2 of Support

The same procedures as in Production Example of Support 1 were performed except that the surface layers were not laminated on both surfaces of the thermoplastic resin film, but only the base layer of the resin composition (a) having a single layer structure was stretched 5 times in the longitudinal direction and 8 times in the transverse direction to provide a biaxially stretched film, which was annealed at 164° C., and then cooled to 55° C., and the edges of the film were slit, thereby providing a thermoplastic resin film having a thickness of 80 μm, which was designated as a support. The support had a porosity of 40%.

Production Example 3 of Support

The same procedures as in Production Example of Support 2 were performed except that the resin composition (a) was changed to a resin composition containing 87% by mass of a propylene homopolymer (Novatec PP MA-8, a trade name, available from Japan Polypropylene Corporation, melting point: 164° C.) and 13% by mass of high density polyethylene (Novatec HD HJ580, a trade name, available from Japan Polyethylene Corporation, melting point: 134° C.), thereby providing a thermoplastic resin film having a thickness of 80 μm, which was designated as a support. The support had a porosity of 0%.

Production Example 4 of Support

A polyethylene terephthalate film having a thickness of 100 μm (Lumirror S10 #100, a trade name, available from Toray Industries, Ltd.) was designated as a support. The support had a porosity of 0%.

Production of Surface Treatment Layer

Production Example 1 of Olefin Copolymer Emulsion (A)

40 kg of isopropanol (Tokuso IPA, a trade name, available from Tokuyama Corporation) was charged in a reactor having an inner capacity of 150 L equipped with a reflux condenser, a nitrogen introduction tube, a stirrer, a thermometer, a dropping funnel and a heating jacket, and 12.6 kg of N,N-dimethylaminoethyl methacrylate (Methacrylate DMA, a trade name, available from Sanyo Chemical Industries, Ltd.), 12.6 kg of butyl methacrylate (Acryester B, a trade name, available from Mitsubishi Rayon Co., Ltd.), and 2.8 kg of a higher alcohol methacrylate ester (Acryester SL, a mixture of lauryl methacrylate and tridecyl methacrylate, available from Mitsubishi Rayon Co., Ltd.) were charged under stirring. Subsequently, the interior of the system was substituted with nitrogen, and after increasing the inner temperature to 80° C., 0.3 kg of 2,2'-azobisisobutyronitrile (V-60 (AIBN), a trade name, available from Wako Pure Chemical Industries, Ltd.) was added as a polymerization initiator to the system to initiate polymerization.

Subsequently, the polymerization was performed for 4 hours while maintaining the reaction temperature to 80° C., and the resulting copolymer was neutralized with 4.3 kg of glacial acetic acid (available from Wako Pure Chemical Industries, Ltd.).

Subsequently, while distilling off isopropanol from the reactor, 48.3 kg of ion exchanged water was added thereto to substitute the system, and thus a viscous aqueous solution (solid concentration: 35% by mass) of a cationic polymer formed of a methacrylic copolymer (weight average molecular weight: 40,000) was obtained and used as a dispersant for an olefin copolymer emulsion.

A raw material resin was melt-kneaded and emulsified by the following manner by using a twin screw extruder (TEX30HSS, a trade name, available from Japan Steel Works, Ltd.), thereby producing an olefin copolymer emulsion (A).

Specifically, an ethylene-methacrylic acid-acrylate ester copolymer (Nucrel N035C, a trade name, available from Du Pont-Mitsui Polychemicals Co., Ltd.) in the form of pellets, which was used as an olefin copolymer, was fed from a hopper to the extruder, and melt-kneaded under conditions of a rotation number of screws of 230 rpm and a cylinder temperature of from 160 to 250° C.

Subsequently, the dispersant thus produced above was continuously fed to the inlet of the extruder positioned at the intermediate part of the cylinder in an amount of 5 parts by mass (in terms of solid content) per 100 parts by mass of the olefin copolymer to emulsify and disperse the olefin copolymer, which was then extruded from the outlet of the extruder to provide a milky white aqueous dispersion.

Ion exchanged water was added to the aqueous dispersion to regulate the solid content thereof to 45% by mass to provide an olefin copolymer emulsion (A1). The olefin copolymer emulsion (A1) was measured for the volume average particle diameter with a laser diffraction particle size distribution analyzer (SALD-2200, available from Shimadzu Corporation), and the volume average particle diameter was 1.0 μm.

Production Example 2 of Olefin Copolymer Emulsion (A)

The olefin copolymer was emulsified and dispersed in the same manner as in Production Example 1 of Olefin Copolymer Emulsion (A) except that the rotation number of screws of the extruder in Production Example 1 was changed to 300 rpm, thereby providing an olefin copolymer emulsion (A2). The olefin copolymer emulsion (A2) had a volume average particle diameter of 0.7 μm.

Production Example 3 of Olefin Copolymer Emulsion (A)

The olefin copolymer was emulsified and dispersed in the same manner as in Production Example 1 of Olefin Copolymer Emulsion (A) except that the rotation number of screws of the extruder in Production Example 1 was changed to 270 rpm, and the amount of the dispersant fed was changed to 20 parts by mass (in terms of solid content) per 100 parts by mass of the olefin copolymer, thereby providing an olefin copolymer emulsion (A3). The olefin copolymer emulsion (A3) had a volume average particle diameter of 0.5 μm.

Production Example 4 of Olefin Copolymer Emulsion (A)

A commercially available ethylene-vinyl acetate copolymer resin aqueous dispersion (Aquatex EC-1200, a trade name, available from JCR Co., Ltd., average particle diameter: 1.4 μm) was obtained and used as an olefin copolymer emulsion (A4).

Production Example 5 of Olefin Copolymer Emulsion (A)

A commercially available ethylene-vinyl acetate copolymer resin aqueous dispersion (Aquatex MC-3800, a trade name, available from JCR Co., Ltd., average particle diameter: 0.9 μm) was obtained and used as an olefin copolymer emulsion (A5).

Production Example of Acrylic Copolymer Emulsion

A commercially available acrylic resin aqueous dispersion (Voncoat VO-8, a trade name, available from DIC Corporation) was obtained and used as an acrylic copolymer emulsion (A6).

Production Example of Urethane Copolymer Emulsion

A commercially available urethane resin aqueous dispersion (Hydran CP-7610, a trade name, available from DIC Corporation) was obtained and used as a urethane copolymer emulsion (A7).

Production Example of Silane Coupling Agent (B)

Commercially available silane coupling agents, 3-glycidoxypropyltrimethoxysilane (KBM-403, a trade name), 3-glycidoxypropylmethyldimethoxysilane (KBM-402, a trade name), 3-glycidoxypropyltriethoxysilane (KBE-403, a trade name), 3-glycidoxypropylmethyldiethoxysilane (KBE-402, a trade name), 3-methacryloxypropyltrimethoxysilane (KBM-503, a trade name), 3-acryloxypropyltrimethoxysilane (KBM-5103, a trade name), 3-aminopropyltrimethoxysilane (KBM-903, a trade name), 3-ureidopropyltriethoxysilane (KBE-585, a trade name), 3-mercaptopropyltrimethoxysilane (KBM-803, a trade name), 3-isocyanatopropyltriethoxysilane (KBE-9007, a trade name), and vinyltrimethoxysilane (KBM-1003, a trade name) (all available from Shin-Etsu Chemical Co., Ltd.) were obtained and used as silane coupling agents (B1) to (B11) respectively.

Production Example 1 of Ethyleneimine Polymer (C)

In a four-neck flask equipped with a stirrer, a reflux condenser, a thermometer and a nitrogen introduction tube, 100 parts by mass of a polyethyleneimine aqueous solution (Epomin P-1000, a trade name, available from Nippon Shokubai Co., Ltd., polymerization degree: 1,600), 10 parts by mass of n-butyl chloride, and 10 parts by mass of propylene glycol monomethyl ether were charged, and after substituting the interior of the system with nitrogen, the mixture was subjected to modification reaction under nitrogen stream at 80° C. for 25 hours, thereby providing a butyl-modified polyethyleneimine aqueous solution having a solid content of 20% by mass, which was used as an ethyleneimine polymer (C1).

Production Example 2 of Ethyleneimine Polymer (C)

In a four-neck flask equipped with a stirrer, a reflux condenser, a thermometer and a nitrogen introduction tube, 100 parts by mass of a polyethyleneimine aqueous solution (Epomin P-1000, a trade name, available from Nippon Shokubai Co., Ltd., polymerization degree: 1,600), 10 parts by mass of glycidol, and 10 parts by mass of propylene glycol monomethyl ether were charged, and after substituting the interior of the system with nitrogen, the mixture was subjected to modification reaction under nitrogen stream at 80° C. for 16 hours, thereby providing a glycidol-modified polyethyleneimine aqueous solution having a solid content of 20% by mass, which was used as an ethyleneimine polymer (C2).

Production Example 3 of Ethyleneimine Polymer (C)

A commercially available modified polyethyleneimine aqueous solution (Polymin SK, a trade name, available from BASF Japan, Ltd.) was obtained and used as an ethyleneimine polymer (C3).

Production Example 1 of Polymer Antistatic Agent (D)

In a four-neck flask equipped with a stirrer, a reflux condenser, a thermometer and a nitrogen introduction tube, 35 parts by mass of dimethylaminoethyl methacrylate, 20 parts by mass of ethyl methacrylate, 20 parts by mass of cyclohexyl methacrylate, 25 parts by mass of stearyl methacrylate, 150 parts by mass of ethyl alcohol, and 1 part by mass of azobisisobutyronitrile were charged, and after substituting the interior of the system with nitrogen, the mixture was subjected to polymerization reaction under nitrogen stream at 80° C. for 6 hours.

Subsequently, 70 parts by mass of a 60% by mass ethyl alcohol solution of 3-chloro-2-hydroxypropyl ammonium chloride was added thereto, and after subjecting the mixture to reaction at a temperature of 80° C. for 15 hours, ethyl alcohol was distilled off while adding water dropwise thereto, thereby providing finally a quaternary ammonium salt-containing acrylic resin aqueous solution having a solid content of 30%, which was used as a polymer antistatic agent (D1).

Production Example 2 of Polymer Antistatic Agent (D)

In a four-neck flask equipped with a stirrer, a reflux condenser, a thermometer and a nitrogen introduction tube, 40 parts by mass of dimethylaminoethyl methacrylate, 50 parts by mass of methyl methacrylate, 10 parts by mass of 2-hydroxyethyl methacrylate, 100 parts by mass of isopropyl alcohol, and 1 part by mass of azobisisobutyronitrile were charged, and after substituting the interior of the system with nitrogen, the mixture was subjected to polymerization reaction under nitrogen stream at 80° C. for 3 hours.

Subsequently, a solution obtained by dissolving 18.5 parts by mass of sodium monochloroacetate in 20 parts by mass of water was added thereto, and after subjecting the mixture to reaction at a temperature of 80° C. for 3 hours, isopropyl alcohol was distilled off while adding water dropwise thereto, thereby providing finally a quaternary ammonium salt-containing acrylic resin aqueous solution having a solid content of 20%, which was used as a polymer antistatic agent (D2).

Example 1

An aqueous solution containing 100 parts by mass in terms of solid content of the olefin copolymer emulsion (A1) having an average particle diameter of 1.0 μm produced in the above production example and 5 parts by mass in terms of solid content of 3-glycidoxypropyltrimethoxysilane was prepared and used as a coating solution.

The support produced in Production Example 1 of Support was subjected to a corona discharge treatment of a throughput of 30 W·min/m² on both surfaces thereof, and then the coating solution was coated on both surfaces of the support to make a solid content after drying of 0.36 g/m² per one surface with a roll coater and dried with an oven at 60° C. to provide a surface treatment layer, thereby providing a recording sheet of Example 1.

Examples 2 to 6, 10, 11 and 14 to 28, and Comparative Examples 1 to 3 and 5 to 8

Recording sheets of Examples 2 to 6, 10, 11 and 14 to 28, and Comparative Examples 1 to 3 and 5 to 8 were produced in the same manner as in Example 1 except that the coating solution in Example 1 was changed to a coating solution containing the raw materials shown in Table 1 at the mixing ratio shown in Table 2, with which the surface treatment layer was provided.

Examples 7 to 9

Recording sheets of Examples 7 to 9 were produced in the same manner as in Example 3 except that the solid content per one surface after drying of the surface treatment layer in Example 3 was changed to the amount shown in Table 2.

Examples 12 and 13, and Comparative Example 4

Recording sheets of Examples 12 and 13, and Comparative Example 4 were produced in the same manner as in Example 11 except that the solid content per one surface after drying of the surface treatment layer in Example 11 was changed to the amounts shown in Table 2.

Examples 29 to 31

Recording sheets of Examples 29 to 31 were produced in the same manner as in Example 3 except that the support in Example 3 was changed to the support shown in Table 2.

Example 32

A recording sheet of Example 32 was produced in the same manner as in Example 21 except that the support in Example 21 was changed to the support shown in Table 2.

TABLE 1

| Kind | No. | Content |
|---|---|---|
| Olefin copolymer emulsion (A) | A1 | ethylene-methacrylic acid copolymer resin aqueous dispersion having average particle diameter of 1.0 μm obtained in Production Example |
| | A2 | ethylene-methacrylic acid copolymer resin aqueous dispersion having average particle diameter of 0.7 μm obtained in Production Example |
| | A3 | ethylene-methacrylic acid copolymer resin aqueous dispersion having average particle diameter of 0.5 μm obtained in Production Example |
| | A4 | ethylene-vinyl acetate copolymer resin aqueous dispersion (Aquatex EC-1200, trade name, available from JCR Co., Ltd., average particle diameter: 1.4 μm) |
| | A5 | ethylene-vinyl acetate copolymer resin aqueous dispersion (Aquatex MC-3800, trade name, available from JCR Co., Ltd., average particle diameter: 0.9 μm) |
| Acrylic copolymer emulsion | A6 | acrylic resin aqueous dispersion (Voncoat VO-8, trade name, available from DIC Corporation) |
| Urethane copolymer emulsion | A7 | urethane resin aqueous dispersion (Hydran CP-7610, trade name, available from DIC Corporation) |
| Silane coupling agent (B) | B1 | 3-glycidoxypropyltrimethoxysilane (KBM-403, trade name, available from Shin-Etsu Chemical Co., Ltd.) |
| | B2 | 3-glycidoxypropylmethyldimethoxysilane (KBM-402, trade name, available from Shin-Etsu Chemical Co., Ltd.) |
| | B3 | 3-glycidoxypropyltriethoxysilane (KBE-403, trade name, available from Shin-Etsu Chemical Co., Ltd.) |
| | B4 | 3-glycidoxypropylmethyldiethoxysilane (KBE-402, trade name, available from Shin-Etsu Chemical Co., Ltd.) |
| | B5 | 3-methacryloxypropyltrimethoxysilane (KBM-503, trade name, available from Shin-Etsu Chemical Co., Ltd.) |
| | B6 | 3-acryloxypropyltrimethoxysilane (KBM-5103, trade name, available from Shin-Etsu Chemical Co., Ltd.) |
| | B7 | 3-aminopropyltrimethoxysilane (KBM-903, trade name, available from Shin-Etsu Chemical Co., Ltd.) |
| | B8 | 3-ureidopropyltriethoxysilane (KBE-585, trade name, available from Shin-Etsu Chemical Co., Ltd.) |
| | B9 | 3-mercaptopropyltrimethoxysilane (KBM-803, trade name, available from Shin-Etsu Chemical Co., Ltd.) |
| | B10 | 3-isocyanatopropyltriethoxysilane (KBE-9007, trade name, available from Shin-Etsu Chemical Co., Ltd.) |
| | B11 | vinyltrimethoxysilane (KBM-1003, trade name, available from Shin-Etsu Chemical Co., Ltd.) |
| Ethyleneimine copolymer (C) | C1 | butyl-modified polyethyleneimine aqueous solution obtained in Production Example |
| | C2 | glycidol-modified polyethyleneimine aqueous solution obtained in Production Example |
| | C3 | modified polyethyleneimine (Polymin SK, trade name, available from BASF Japan, Ltd.) |
| Polymer antistatic agent (D) | D1 | cationic quaternary ammonium salt-containing acrylic resin aqueous solution obtained in Production Example |
| | D2 | amphoteric quaternary ammonium salt-containing acrylic resin aqueous solution obtained in Production Example |

TABLE 2

| | | Surface treatment layer, amount ratio (part by mass) | | | | | | | | | | | | | | | | | | | |
|---|---|---|---|---|---|---|---|---|---|---|---|---|---|---|---|---|---|---|---|---|---|---|
| | | Olefin emulsion (A) | | | | | *1 | *2 | Silane coupling agent (B) | | | | | | | | | | | Ethyleneimine polymer (C) | | | Polymer antistatic agent (D) | | Solid content of surface treatment layer |
| | Support | A1 | A2 | A3 | A4 | A5 | A6 | A7 | B1 | B2 | B3 | B4 | B5 | B6 | B7 | B8 | B9 | B10 | B11 | C1 | C2 | C3 | D1 | D2 | (g/m²) |
| Example 1 | Production Example 1 | 100 | — | — | — | — | — | — | 5 | — | — | — | — | — | — | — | — | — | — | — | — | — | — | — | 0.36 |
| Example 2 | Production Example 1 | 100 | — | — | — | — | — | — | 2.5 | — | — | — | — | — | — | — | — | — | — | 4 | — | — | 5 | — | 0.36 |
| Example 3 | Production Example 1 | 100 | — | — | — | — | — | — | 5 | — | — | — | — | — | — | — | — | — | — | 4 | — | — | 5 | — | 0.36 |
| Example 4 | Production Example 1 | 100 | — | — | — | — | — | — | 7.5 | — | — | — | — | — | — | — | — | — | — | 4 | — | — | 5 | — | 0.36 |
| Example 5 | Production Example 1 | 100 | — | — | — | — | — | — | 10 | — | — | — | — | — | — | — | — | — | — | 4 | — | — | 5 | — | 0.36 |
| Example 6 | Production Example 1 | 100 | — | — | — | — | — | — | 10 | — | — | — | — | — | — | — | — | — | — | 8 | — | — | 10 | — | 0.36 |
| Example 7 | Production Example 1 | 100 | — | — | — | — | — | — | 5 | — | — | — | — | — | — | — | — | — | — | 4 | — | — | 5 | — | 0.27 |
| Example 8 | Production Example 1 | 100 | — | — | — | — | — | — | 5 | — | — | — | — | — | — | — | — | — | — | 4 | — | — | 5 | — | 0.7 |
| Example 9 | Production Example 1 | 100 | — | — | — | — | — | — | 5 | — | — | — | — | — | — | — | — | — | — | 4 | — | — | 5 | — | 1.1 |
| Example 10 | Production Example 1 | — | 100 | — | — | — | — | — | 5 | — | — | — | — | — | — | — | — | — | — | 4 | — | — | 5 | — | 0.36 |
| Example 11 | Production Example 1 | — | — | 100 | — | — | — | — | 5 | — | — | — | — | — | — | — | — | — | — | 4 | — | — | 5 | — | 0.36 |
| Example 12 | Production Example 1 | — | — | 100 | — | — | — | — | 5 | — | — | — | — | — | — | — | — | — | — | 4 | — | — | 5 | — | 0.18 |
| Example 13 | Production Example 1 | — | — | 100 | — | — | — | — | 5 | — | — | — | — | — | — | — | — | — | — | 4 | — | — | 5 | — | 0.10 |
| Example 14 | Production Example 1 | — | — | — | 100 | — | — | — | 5 | — | — | — | — | — | — | — | — | — | — | 4 | — | — | 5 | — | 0.36 |
| Example 15 | Production Example 1 | — | — | — | — | 100 | — | — | 5 | — | — | — | — | — | — | — | — | — | — | 4 | — | — | 5 | — | 0.36 |
| Example 16 | Production Example 1 | 100 | — | — | — | — | — | — | — | 5 | — | — | — | — | — | — | — | — | — | 4 | — | — | 5 | — | 0.36 |
| Example 17 | Production Example 1 | 100 | — | — | — | — | — | — | — | — | 5 | — | — | — | — | — | — | — | — | 4 | — | — | 5 | — | 0.36 |
| Example 18 | Production Example 1 | 100 | — | — | — | — | — | — | — | — | — | 5 | — | — | — | — | — | — | — | 4 | — | — | 5 | — | 0.36 |
| Example 19 | Production Example 1 | 100 | — | — | — | — | — | — | — | — | — | — | 5 | — | — | — | — | — | — | 4 | — | — | 5 | — | 0.36 |
| Example 20 | Production Example 1 | 100 | — | — | — | — | — | — | — | — | — | — | — | 5 | — | — | — | — | — | 4 | — | — | 5 | — | 0.36 |
| Example 21 | Production Example 1 | 100 | — | — | — | — | — | — | — | — | — | — | — | — | 5 | — | — | — | — | 4 | — | — | 5 | — | 0.36 |

TABLE 2-continued

| | | Surface treatment layer, amount ratio (part by mass) | | | | | | | | | | | | | | | | | | | | | | | |
|---|---|---|---|---|---|---|---|---|---|---|---|---|---|---|---|---|---|---|---|---|---|---|---|---|---|
| | | Olefin emulsion (A) | | | | | *1 | *2 | Silane coupling agent (B) | | | | | | | | | | | Ethyleneimine polymer (C) | | | Polymer antistatic agent (D) | | Solid content of surface treatment layer |
| | Support | A1 | A2 | A3 | A4 | A5 | A6 | A7 | B1 | B2 | B3 | B4 | B5 | B6 | B7 | B8 | B9 | B10 | B11 | C1 | C2 | C3 | D1 | D2 | (g/m²) |
| Example 22 | Production Example 1 | 100 | — | — | — | — | — | — | 5 | — | — | — | — | — | — | — | — | — | — | 4 | — | — | 5 | — | 0.36 |
| Example 23 | Production Example 1 | 100 | — | — | — | — | — | — | — | — | — | — | — | — | — | 5 | — | — | — | 4 | — | — | 5 | — | 0.36 |
| Example 24 | Production Example 1 | 100 | — | — | — | — | — | — | — | — | — | — | — | — | — | — | 5 | — | — | 4 | — | — | 5 | — | 0.36 |
| Example 25 | Production Example 1 | 100 | — | — | — | — | — | — | — | — | — | — | — | — | — | — | — | 5 | — | 4 | — | — | 5 | — | 0.36 |
| Example 26 | Production Example 1 | 100 | — | — | — | — | — | — | — | — | — | — | — | — | — | — | — | — | 5 | — | 4 | — | 5 | — | 0.36 |
| Example 27 | Production Example 1 | 100 | — | — | — | — | — | — | 5 | — | — | — | — | — | — | — | — | — | — | — | — | 4 | 5 | — | 0.36 |
| Example 28 | Production Example 1 | 100 | — | — | — | — | — | — | 5 | — | — | — | — | — | — | — | — | — | — | 4 | — | — | — | 5 | 0.36 |
| Example 29 | Production Example 1 | 100 | — | — | — | — | — | — | 5 | — | — | — | — | — | 5 | — | — | — | — | 4 | — | — | 5 | — | 0.36 |
| Example 30 | Production Example 2 | 100 | — | — | — | — | — | — | 5 | — | — | — | — | — | — | — | — | — | — | 4 | — | — | 5 | — | 0.36 |
| Example 31 | Production Example 3 | 100 | — | — | — | — | — | — | 5 | — | — | — | — | — | — | — | — | — | — | 4 | — | — | 5 | — | 0.36 |
| Example 32 | Production Example 4 | 100 | — | — | — | — | — | — | 5 | — | — | — | — | — | — | — | — | — | — | 4 | — | — | 5 | — | 0.36 |
| Comparative Example 1 | Production Example 4 | 100 | — | — | — | — | — | — | — | — | — | — | — | — | — | — | — | — | — | 4 | — | — | 5 | — | 0.05 |
| Comparative Example 2 | Production Example 1 | 100 | — | — | — | — | — | — | 0.5 | — | — | — | — | — | — | — | — | — | — | 4 | — | — | 5 | — | 0.06 |
| Comparative Example 3 | Production Example 1 | 100 | — | — | — | — | — | — | 15 | — | — | — | — | — | — | — | — | — | — | 4 | — | — | 5 | — | 0.24 |
| Comparative Example 4 | Production Example 1 | — | — | 100 | — | — | — | — | 5 | — | — | — | — | — | — | — | — | — | — | 4 | — | — | 5 | — | 0.36 |
| Comparative Example 5 | Production Example 1 | — | — | — | — | — | — | — | 5 | — | — | — | — | — | — | — | — | — | — | 4 | — | — | 5 | — | 0.36 |
| Comparative Example 6 | Production Example 1 | — | — | — | — | — | 100 | — | 5 | — | — | — | — | — | — | — | — | — | — | 4 | — | — | 5 | — | 0.36 |
| Comparative Example 7 | Production Example 1 | — | — | — | — | — | — | 100 | 5 | — | — | — | — | — | — | — | — | — | — | 4 | — | — | 5 | — | 0.36 |
| Comparative Example 8 | Production Example 1 | — | — | — | — | — | — | — | 5 | — | — | — | — | — | — | — | — | — | — | 4 | — | — | 5 | — | 0.36 |

Note:
*1 Acrylic emulsion,
*2 Urethane emulsion

Evaluation Example

Printability in Electrophotographic Printing Process Using Liquid Toner

The recording sheets obtained in Examples 1 to 32 and Comparative Examples 1 to 8 were evaluated for printability in the following manner using an electrophotographic printer using a liquid toner (Indigo 5600, a trade name, available from Hewlett-Packard Japan, Ltd.).

Toner Transfer Property

A black solid image having a density of 100% and a black halftone dot image having a density of 30% were printed on one surface of the recording sheets of Examples and Comparative Examples by using the printer. The printed images on the recording sheet were visually confirmed through a magnifying glass, and the toner transfer property was evaluated. The evaluation standard of the toner transfer property is as follows, and the evaluation results are shown in Table 3.

A: good (A clear image was obtained.)
E: poor (An image or a character became faded.)

Water Resistant Adhesion Property of Toner

The recording sheet having been printed in the aforementioned manner was immersed in water at 23° C. for 24 hours. The recording sheet having been taken out from water was lightly wiped with a cloth for removing water on the surface thereof, and after 5 minutes, a cellophane adhesive tape (Cellotape CT-18, a trade name, available from Nichiban Co., Ltd.) was attached to the printed surface and sufficiently adhered thereto, followed by slowly peeling the cellophane adhesive tape by hand. The water resistant adhesion property of the toner was evaluated by visually observing the printed surface after peeling the adhesive tape. The evaluation standard of the water resistant adhesion property of the toner is as follows, and the evaluation results are shown in Table 3.

A: good (No drop-off of the toner was observed.)
B: good (The toner was slightly dropped off.)
C: average (The toner was dropped off in nearly 30% of the area where the adhesive tape had been released, but practically usable.)
D: poor (The toner was dropped off in approximately half of the area where the adhesive tape had been released.)
E: poor (The toner was dropped off in approximately whole of the area where the adhesive tape had been released.)

Water Resistant Adhesion Property of Toner on Lamination

A PET film was laminated on the printed surface of the recording sheet having been printed in the aforementioned manner by a cold lamination process. The PET film used had an adhesive agent on one surface thereof (ProShield Cold UV-HG50, a trade name, available from JetGraph Co., Ltd.), and the lamination process was performed by superimposing the adhesive surface of the PET film on the printed surface of the recording sheet, followed by adhering under pressure at 23° C. The laminate was immersed in water at 23° C. for 24 hours. The recording sheet having been taken out from water was lightly wiped with a cloth for removing water on the surface thereof, and after 5 minutes, the PET film was slowly peeled off by hand. The water resistant adhesion property of the toner on lamination was evaluated by visually observing the printed surface after peeling the laminated film. The evaluation standard of the water resistant adhesion property of the toner on lamination is as follows, and the evaluation results are shown in Table 3.

A: good (No drop-off of the toner was observed.)
B: good (The toner was slightly transferred to the laminated film.)
C: average (The toner was transferred to the laminated film in nearly 30% of the area where the laminated film had been released, but practically usable.)
D: poor (The toner was transferred to the laminated film in approximately half of the area where the laminated film had been released.)
E: poor (The toner was transferred to the laminated film in approximately whole of the area where the laminated film had been released.)

Water Scratch Resistance

The recording sheet having been printed in the aforementioned manner was punched out to a label shape. The printed matter was mounted on an IULTCS color fastness to rubbing tester (Rub Fastness Tester II, available from Suga Test Instruments, Co., Ltd.) and subjected to a rubbing test by rubbing with a wet white cotton cloth 100 times under a load of 500 g, and the presence of the toner having been dropped off was visually evaluated under the following standard. The evaluation results are shown in Table 3.

A: good (No drop-off of the toner was observed.)
B: good (The toner was slightly dropped off.)
C: average (The toner was dropped off in nearly 30% of the area having been subjected to the rubbing test, but practically usable.)
D: poor (The toner was dropped off in approximately half of the area having been subjected to the rubbing test.)
E: poor (The toner was dropped off in approximately whole of the area having been subjected to the rubbing test.)

Printability with Ultraviolet Ray-Curable Printing Ink and Oil-Based Ink

A 100% solid image was printed on one surface of the recording sheets obtained in Examples 1 to 32 and Comparative Examples 1 to 8 with an ultraviolet ray-curable flexographic ink (UV Flexo CF Indigo Blue, a trade name, available from T&K Toka Corporation) or an oil-based offset ink (Best Cure 161 Indigo Blue, a trade name, available from T&K Toka Corporation) to an ink amount of 1.5 g/m$^2$ by using a print tester (RI-III Printability Tester, a trade name, available from Akira Seisakusho, Ltd.). Subsequently, the printed surface with the ultraviolet ray-curable flexographic ink was irradiated with an ultraviolet ray for curing the ink. The irradiation with an ultraviolet ray was performed with one ultraviolet ray lamp (a metal halide lamp, output power: 80 W/cm, available from Eye Graphics Co., Ltd.). The distance between the ultraviolet ray lamp and the printed recording sheet was 10 cm. The printed recording sheet was passed once under the ultraviolet ray lamp at a speed 10 m/min. The recording sheet printed with the oil-based ink was hung in a room at a temperature of 23° C. and a relative humidity of 50% for 3 days for drying the ink.

The printed recording sheets were evaluated for the ink transfer property, the water resistant adhesion property of the ink, the water resistant adhesion property of the ink on lamination, and the water Scratch Resistance, in the same manners as above. The evaluation results are shown in Table 3.

TABLE 3

| | Electrophotographic printing using liquid toner | | | Ultraviolet ray-curable flexographic ink printing | | | | Oil-based ink offset printing | | |
|---|---|---|---|---|---|---|---|---|---|---|
| | Toner transfer property | Water resistant toner adhesion property on lamination | Water Scratch Resistance | Ink transfer property | Water resistant ink adhesion property | Water resistant ink adhesion property on lamination | Water Scratch Resistance | Water resistant ink adhesion property | Water resistant ink adhesion property on lamination | Water Scratch Resistance |
| Example 1 | A | B | A | A | C | C | A | C | C | A |
| Example 2 | A | B | A | A | B | B | A | B | B | A |
| Example 3 | A | A | A | A | A | A | A | A | A | A |
| Example 4 | A | A | A | A | A | A | A | A | A | A |
| Example 5 | A | B | A | A | B | B | A | A | A | A |
| Example 6 | A | B | A | A | A | A | A | A | A | A |
| Example 7 | A | A | A | A | A | A | A | A | A | A |
| Example 8 | A | A | A | A | A | A | A | A | A | A |
| Example 9 | A | A | A | A | A | A | A | A | A | A |
| Example 10 | A | A | A | A | A | A | A | A | A | A |
| Example 11 | A | A | A | A | A | A | A | A | A | A |
| Example 12 | A | B | A | A | B | B | A | B | B | A |
| Example 13 | A | B | A | A | B | B | A | B | B | A |
| Example 14 | A | B | A | A | B | B | A | B | B | A |
| Example 15 | A | B | A | A | B | B | A | B | B | A |
| Example 16 | A | A | A | A | A | A | A | A | A | A |
| Example 17 | A | B | A | A | B | B | A | B | B | A |
| Example 18 | A | C | C | A | B | B | A | B | B | A |
| Example 19 | A | C | C | A | B | B | A | B | B | A |
| Example 20 | A | C | C | A | B | B | A | B | B | A |
| Example 21 | A | B | B | A | B | B | A | B | B | A |
| Example 22 | A | C | B | A | B | B | A | B | B | A |
| Example 23 | A | B | B | A | B | B | A | B | B | A |
| Example 24 | A | B | C | A | B | B | A | B | B | A |
| Example 25 | A | C | C | A | B | B | A | B | B | A |
| Example 26 | A | B | A | A | A | A | A | A | A | A |
| Example 27 | A | A | A | A | A | A | A | A | A | A |
| Example 28 | A | B | A | A | B | B | A | B | B | A |
| Example 29 | A | B | A | A | B | B | A | B | B | A |
| Example 30 | A | A | A | A | A | A | A | A | A | A |
| Example 31 | A | B | A | A | B | B | A | A | A | A |
| Example 32 | A | B | B | A | B | B | A | B | B | A |

TABLE 3-continued

| | Evaluation result of printability in printing processes ||||||||||||
| | Electrophotographic printing using liquid toner |||| Ultraviolet ray-curable flexographic ink printing |||| Oil-based ink offset printing ||||
| | Toner transfer property | Water resistant toner adhesion property | Water resistant toner adhesion property on lamination | Water Scratch Resistance | Ink transfer property | Water resistant ink adhesion property | Water resistant ink adhesion property on lamination | Water Scratch Resistance | Ink transfer property | Water resistant ink adhesion property | Water resistant ink adhesion property on lamination | Water Scratch Resistance |
|---|---|---|---|---|---|---|---|---|---|---|---|---|
| Comparative Example 1 | A | D | E | D | A | D | E | A | A | D | E | A |
| Comparative Example 2 | A | C | E | A | A | B | C | A | A | B | C | A |
| Comparative Example 3 | E | C | E | A | E | C | D | A | E | C | D | A |
| Comparative Example 4 | A | D | D | A | A | B | B | A | A | B | B | A |
| Comparative Example 5 | A | C | E | A | A | A | A | A | A | A | B | A |
| Comparative Example 6 | A | B | E | A | A | A | A | A | A | A | A | A |
| Comparative Example 7 | A | E | E | D | A | C | C | B | A | C | C | B |
| Comparative Example 8 | A | E | E | D | A | C | C | B | A | C | C | B |

It was understood from Table 3 that the printed matters obtained by subjecting the recording sheets of Examples 1 to 32 to electrophotographic printing using a liquid toner were good or average in all the toner transfer property, the toner water resistant adhesion property, the toner water resistant adhesion property on lamination, and the water Scratch Resistance. Accordingly, it is understood that the recording sheet of Examples 1 to 32 are excellent in the transfer property and the adhesion property of a liquid toner in that printing process and thus are excellent in water resistance thereof.

Similarly, it is understood that the recording sheet of Examples 1 to 32 are excellent in the transfer property and the adhesion property of an ultraviolet ray-curable printing ink and an oil-based printing ink, which have been ordinarily used, and thus are excellent in water resistance thereof.

On the other hand, it was understood that the printed matters obtained by subjecting the recording sheets of. Comparative Examples 1 to 8 to electrophotographic printing using a liquid toner were poor in one of the toner transfer property, the toner water resistant adhesion property, the toner water resistant adhesion property on lamination, and the water Scratch Resistance. Accordingly, it is understood that the recording sheet of Examples 1 to 32 are excellent as compared to the recording sheet of Comparative Examples 1 to 8.

In Comparative Example 3, a recording sheet was produced and tested where the amount of the silane coupling agent added was increased to 15 parts by mass or more. As a result, it was confirmed that as compared to the recording sheet where the amount of the silane coupling agent added was increased to 15 parts by mass or more, the recording sheets of Examples 2 to 5 where the amount thereof added was 14 parts by mass or less were excellent in the transfer property and the water resistant adhesion property on lamination for a liquid toner, an ultraviolet ray-curable printing ink and an oil-based printing ink.

In Comparative Example 4, a recording sheet was produced and tested where the solid content of the surface treatment layer using the olefin emulsion (A1) was less than 0.1 g/m². As a result, it was confirmed that as compared to the recording sheet where the solid content of the surface treatment layer was less than 0.1 g/m², the recording sheets of Examples 11 to 13 were excellent in the water resistant adhesion property and the water resistant adhesion property on lamination of a printed matter using a liquid toner.

The invention claimed is:

1. A recording sheet containing a support formed of a thermoplastic resin film, and a surface treatment layer provided on at least one surface of the support, wherein:

the surface treatment layer is formed by coating and drying on the support a coating solution containing an olefin copolymer emulsion (A) and a silane coupling agent (B), the silane coupling agent (B) contained in the coating solution has a solid content of from 2.5 to 10 parts by mass per 100 parts by mass of a solid content of the olefin copolymer emulsion (A) contained in the coating solution, and the surface treatment layer has a solid content of from 0.1 to 5 g/m².

2. The recording sheet according to claim 1, wherein the coating solution further contains an ethyleneimine polymer (C).

3. The recording sheet according to claim 1, wherein the silane coupling agent (B) has a group that reacts with an olefin copolymer constituting the olefin copolymer emulsion (A).

4. The recording sheet according to claim 1, wherein the silane coupling agent (B) has an alkoxysilyl group or a silanol group and has at least one functional group selected from the group consisting of an epoxy group, a vinyl group, a (meth)acryl group, an amino group, an ureido group, a mercapto group, and an isocyanate group.

5. The recording sheet according to claim 1, wherein the olefin copolymer emulsion (A) is an aqueous dispersion containing an olefin copolymer (a) containing a constitutional unit derived from an unsaturated carboxylic acid monomer or an anhydride thereof that is dispersed in water by using as a dispersant (b) at least one selected from the group consisting of a nonionic surfactant, a nonionic water-soluble polymer, a cationic surfactant, and a cationic water-soluble polymer, and a mass ratio (a)/(b) in terms of solid content of the olefin copolymer (a) and the dispersant (b) is from 100/1 to 100/40.

6. The recording sheet according to claim 1, wherein an olefin copolymer in the olefin copolymer emulsion (A) has a volume average particle diameter of from 0.2 to 3 μm.

7. The recording sheet according to claim 1, wherein the silane coupling agent (B) is an epoxy silane coupling agent.

8. The recording sheet according to claim 1, wherein the coating solution further contains a polymer antistatic agent (D).

9. The recording sheet according to claim 1, wherein the thermoplastic resin film contains a polyolefin based resin or a polyester resin.

* * * * *